United States Patent [19]

Kelderman

[11] Patent Number: 5,452,949

[45] Date of Patent: Sep. 26, 1995

[54] TRACK SYSTEM FOR VEHICLES

[76] Inventor: Gary L. Kelderman, 2674 Hwy. 92, Oskaloosa, Iowa 52577

[21] Appl. No.: 229,926

[22] Filed: Apr. 19, 1994

Related U.S. Application Data

[63] Continuation-in-part of Ser. No. 165,641, Dec. 13, 1993, abandoned.

[51] Int. Cl.⁶ .................... B62D 55/14; B62D 55/104
[52] U.S. Cl. .................. 305/24; 305/23; 305/29; 180/9.44
[58] Field of Search ..................... 305/15, 21, 23, 305/24, 29, 31, 32, 56, 10, 60; 180/9.1, 9.21, 9.26, 9.44

[56] References Cited

U.S. PATENT DOCUMENTS

| | | |
|---|---|---|
| 1,038,569 | 9/1912 | Grover . |
| 2,105,917 | 1/1938 | Herrington . |
| 2,111,587 | 3/1938 | Goldstine . |
| 2,467,947 | 4/1949 | Skelton . |
| 2,496,136 | 1/1950 | Smith . |
| 2,719,062 | 9/1955 | Arps . |
| 3,082,044 | 3/1963 | Klemm et al. . |
| 3,163,249 | 12/1964 | Ledohowski . |
| 3,412,820 | 11/1968 | Wachholz . |
| 3,458,214 | 7/1969 | West . |
| 3,774,708 | 11/1973 | Purcell et al. . |
| 3,826,388 | 7/1974 | Oldenberg et al. ............... 180/9.44 X |
| 3,841,424 | 10/1974 | Purcell et al. . |
| 3,885,641 | 5/1975 | Harris . |
| 4,227,749 | 10/1980 | Hesse . |
| 4,313,516 | 2/1982 | Terry . |
| 4,406,501 | 9/1983 | Christensen . |
| 4,458,954 | 7/1984 | Haas . |
| 4,708,218 | 11/1987 | Makela . |
| 4,865,141 | 9/1989 | Gey . |
| 4,936,639 | 6/1990 | Pohjola ............................. 180/9.44 X |
| 4,953,919 | 9/1990 | Langford . |
| 5,316,381 | 5/1994 | Isaacson et al. . |

FOREIGN PATENT DOCUMENTS

| | | | |
|---|---|---|---|
| 0017187 | 1/1988 | Japan ........................................ | 305/24 |
| 0189170 | 4/1958 | Sweden . | |
| 1263573 | 10/1986 | U.S.S.R. ................................. | 305/23 |

Primary Examiner—Russell D. Stormer
Attorney, Agent, or Firm—Henderson & Sturm

[57] ABSTRACT

A track suspension system for a vehicle having a frame and a continuous flexible track. A drive wheel is attached to the frame for engaging and driving the continuous flexible track. A leading idler arm is pivotally attached to the frame on each side thereof and a leading idler wheel is rotatably mounted for engagement with the track. A trailing idler arm is provided on each side of the vehicle and is pivotally attached to the frame and a trailing idler wheel engagement with the track is rotatably mounted to one end of each idler trailing arm. A leading mid-roller assembly engagement with the track is operably attached to the leading idler arm and a trailer mid-roller assembly is in engagement with the track and is attached to the trailing idler arm. A cushioning device interconnects the leading and trailer idler arms for providing shock absorbing function. A valve system is provided for releasing all of the pressure on the leading and trailing idler arms so that all of the weight of the tractor is on the mid-roller assembly, thereby facilitating easier turning. The valve system is also operable to put leading and trailing idler arms in either a cushioning mode for use in the fields or travel down the highway or into a non-cushioning mode for use in very soft fields.

16 Claims, 4 Drawing Sheets

MODE 1: AUTOMATIC CUSHION HIGHWAY TRAVEL - LOAD SENSOR USED
MODE 2: CYLINDERS LOCKED, NO CUSHIONING - USED ON SOFT GROUND
MODE 3: IDLER WHEELS RAISED - EASIER TURNING - MIDDLE ROLLERS TAKING LOAD

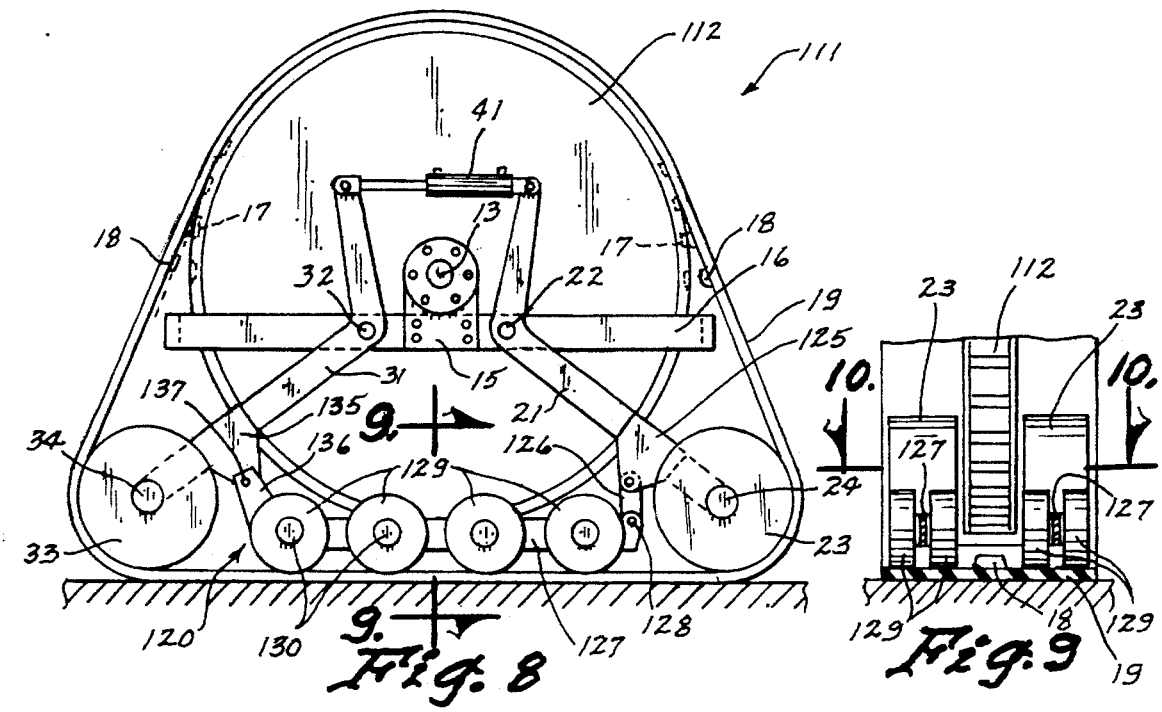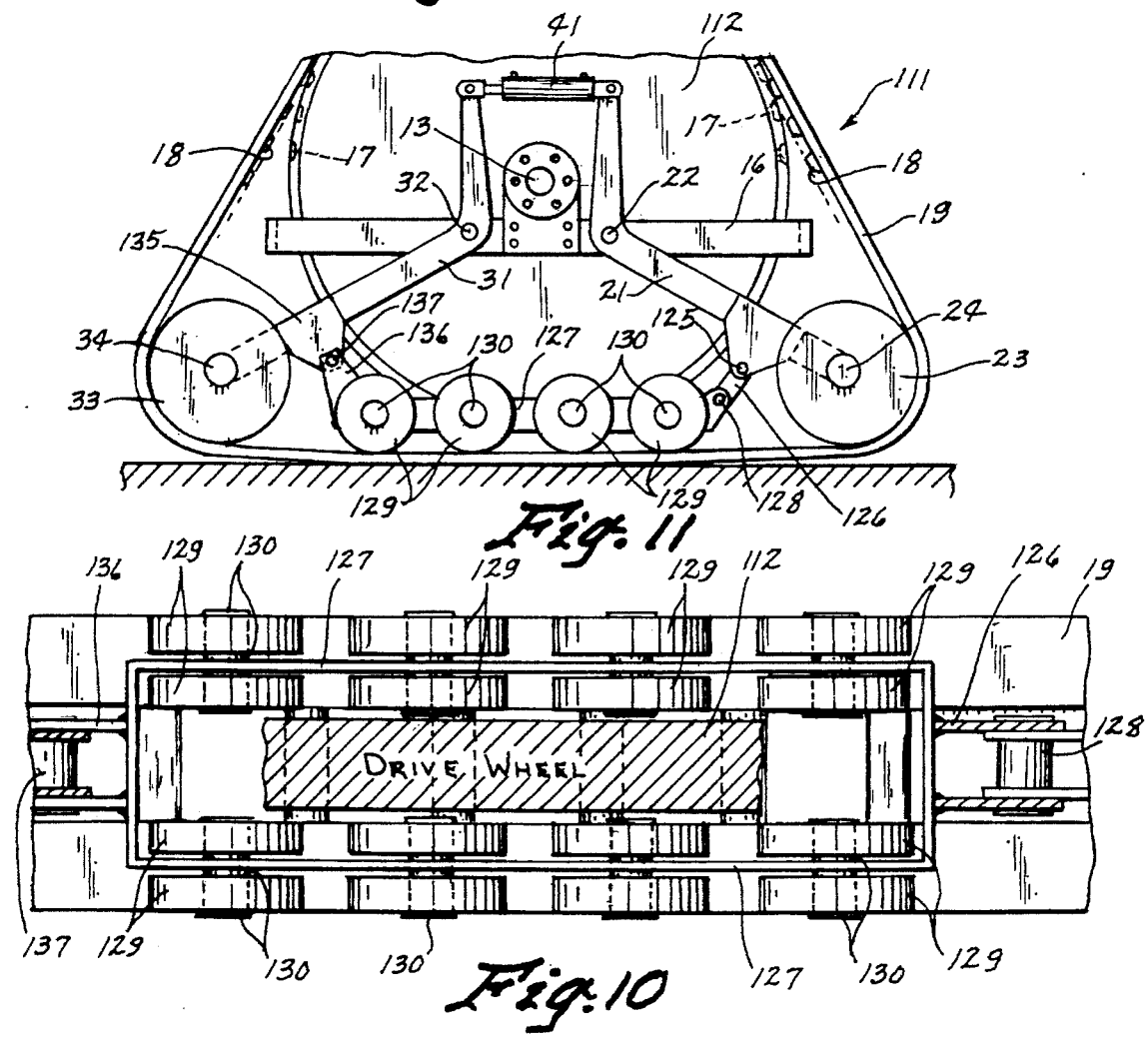

TRACK SYSTEM FOR VEHICLES

CROSS-REFERENCE TO RELATED APPLICATIONS

This application is a continuation-in-part of U.S. patent application Ser. No. 08/165,641 filed Dec. 13, 1993 and now abandoned.

TECHNICAL FIELD

The present invention relates generally to a track system for vehicles and more particularly to a rubber track of a continuous type which can be attached to an agricultural tractor or other vehicle of a similar type which needs to traverse either soft or wet ground, or ground which should not be compacted any more than is necessary.

BACKGROUND ART

Track-type vehicles are commonly used for moving earth or the like in road construction and other earth moving tasks. While these track machines have on occasion been used for agricultural purposes, they are not in common usage in most parts of the country. These track systems are typically metal tracks of a continuous type.

Agricultural tractors and other large agricultural implements, such as combines or the like, are quite heavy and because all this weight is distributed to a relatively small area on the tires of these vehicles, they cause a great deal of compaction of the earth. This is adverse to growing crops thereon, which typically needs loose soil. Furthermore, there are many times when fields are simply too wet for an ordinary agricultural tractor or agricultural implement, such as a combine, to enter the fields because they would merely become bogged down in the mud due to the fact that there is such a small area of the tire which is in contact with the ground. It is of course well known that the more the weight is distributed to a larger ground engaging structure the less likely it is to compact the earth or to get stuck in the mud. Consequently, there has been some development of track systems such as that shown in U.S. Pat. No. 4,953,919 to Langford.

One particular need is for a track system which can be used on agricultural equipment as it is currently being produced rather than to design an entirely new track system for an agricultural tractor, combine, etc.

Another need is for such a track system which provides a suspension which permits cushioning. Also, if such a conversion kit were to be placed on an agricultural tractor or the like, the advantage of having a large ground engaging portion thereon becomes a disadvantage when it is desired to turn the vehicle. Consequently there is a need to solve this particular problem.

DISCLOSURE OF THE INVENTION

The present invention relates generally to a track suspension system for a vehicle having a frame and a continuous flexible track. A drive wheel is attached to the frame for engaging and driving the continuous flexible track. A leading idler arm is pivotally attached to the frame on each side of the vehicle and a leading idler wheel is rotatably mounted thereon for engagement with the track. A trailing idler arm is provided on each side of the vehicle and is pivotally attached to the frame. A trailing idler wheel in engagement with the track is rotatably mounted to one end of each idler trailing arm.

A leading mid-roller assembly in engagement with the track is operably attached to the leading idler arm and a trailer mid-roller assembly is in engagement with the track and is attached to the trailing idler arm. A cushioning device interconnects the leading and trailing idler arms for providing a shock absorbing function when the leading and trailing idler wheels move away from each other due to pivoting of the leading and trailing idler arms.

A valve system is provided for releasing all of the pressure on the leading and trailing idler arms so that all of the weight of the tractor shifts to the mid-roller assembly, thereby facilitating easier turning. The valve system is also operable to put leading and trailing idler arms in either a cushioning mode for use in the fields or travel down the highway and also into a non-cushioning mode for use in very soft fields or to disconnect the hydraulic systems for repair.

An object of the present invention is to provide an improved track system for vehicles.

Another object of the present invention is to provide an improved suspension system for track vehicles.

A further object of the present invention is to provide a suspension system which prevents and counteracts torque roll to maintain the idlers and mid-rollers from pivoting to the top of the drive wheel, thereby keeping them fully supporting the portion of the track which is engaging the earth.

Another object of the present invention is to provide an improved suspension system with a cushioning and shock absorbing structure.

A still further object of the invention is to provide such a track system which has the ability to release the leading and trailing arms so that their associated idler wheels move up to cause a smaller ground engagement portion, thereby making the vehicle easier to turn.

Another object of the present invention is to provide a mid-roller assembly which permits the drive wheel to extend below and between it whereby a larger drive wheel can be used while the mid-wheel assembly can, at the same time, support a large area of the track thereunder.

Other objects, advantages, and novel features of the present invention will be apparent from the following detailed description of the invention when considered in accordance with the accompanying drawings.

BRIEF DESCRIPTION OF THE DRAWINGS

FIG. 4 is a schematic view of the control system for the present invention which allows cushioning of the load through the idler wheels and idler arms and also the system which allows the system to convert between a full load support of FIG. 2 and a shorter load support of FIG. 3 for turning or the like;

FIG. 8 is a side elevational view like FIG. 2, but showing a modified version having a unified mid-roller assembly and a larger drive wheel which extends down below the top of the mid-roller assembly;

FIG. 9 is an enlarged cross sectional view taken along line 9—9 of FIG. 8;

FIG. 10 is an enlarged cross sectional view taken along line 10—10 of FIG. 9; and FIG. 11 is a view of the FIG. 8 device, showing it in the mode for shorter load support for easier turning.

BEST MODE FOR CARRYING OUT THE INVENTION

Figure 1:
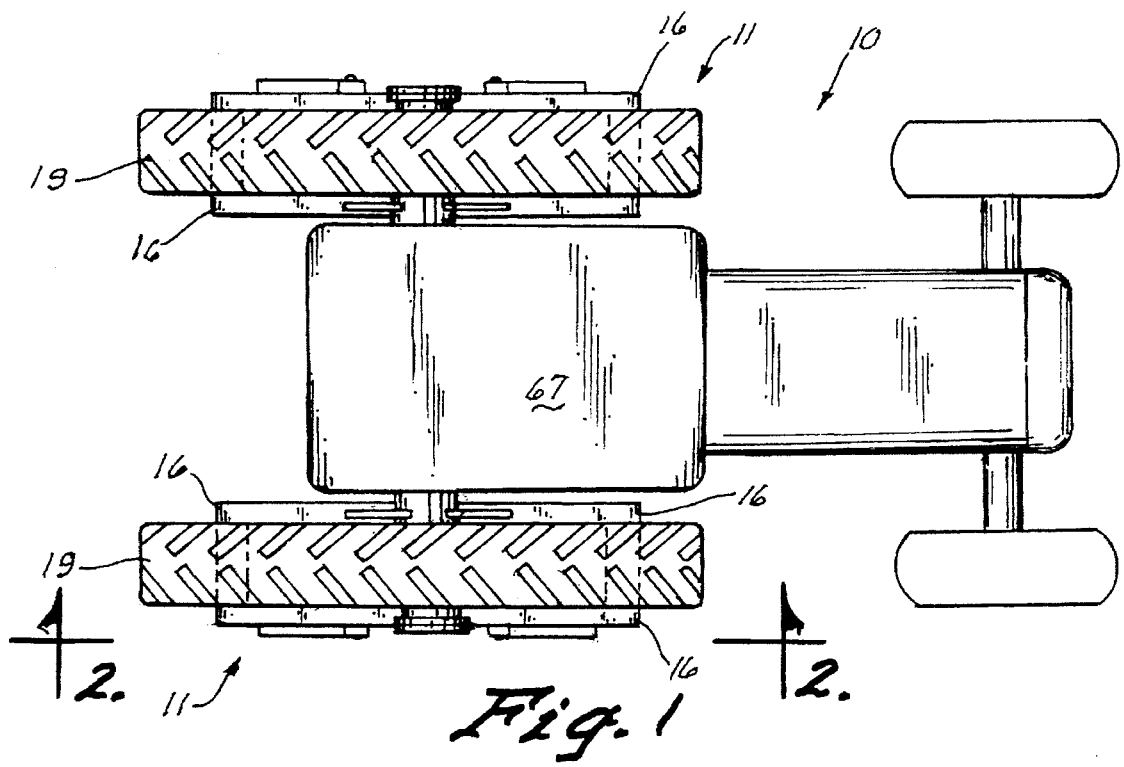
FIG. 1 is a top plan view of an agricultural tractor having a rubber track system of the present invention attached thereto.

Referring now to the drawings wherein like reference numerals designate identical or corresponding parts throughout the several views, FIG. 1 shows an agricultural tractor (10) having the rubber track system (11) attached to the rear wheel assembly thereof and with the normal rubber tires removed therefrom. A drive wheel (12) is rotatably attached to the tractor (10) through an axle (13) to which it is rigidly affixed. The axle (13) is rotatably mounted by a bearing (14) and is rotated in a conventional fashion through the tractor (10) by its engine and through a transmission which can vary the speeds and allow forward and reverse rotation. The bearing (14) is mounted by a bracket (15) to the frame (16) of the tractor (10).

The drive wheel (12) has a plurality of drive projections (17) disposed thereon which engage depressions (18) in the rubber track (19). The frame (19) passes around the drive wheel (12) on each side of the tractor (10) as can readily be seen in FIG. 1.

A leading trail arm (21) is pivotally attached to the frame (16) at pivot pin (22) and a trailing swing arm (31) is pivotally attached by a pivot pin (32) to the frame (16). The leading swing arm (21) has an idler roller (23) rotatably attached thereto through bearing structure (24). Similarly, the trailing swing arm (33) is mourned an axle or bearing structure (34). Rigidly attached to the leading swing arm (21) is a bracket (25) having another member (26) also rigidly attached thereto. A leading trolley assembly (27) is pivotally attached through a pin (28) so that the trolley (27) can pivot as needed. A total of four mid-rollers (29) are rotatably attached to the trolley (27) on each side of the tractor (10). These trolleys (29) are rotatably mounted about a pin (30).

Similarly, on the trailing swing arm (31) is a bracket (35) having a member (36) attached thereto. A trolley assembly (37), which is identical to the trolley (27) of the leading swing arm, is pivotally attached through a pin (38). Mid-rollers (39) are rotatably attached by axles (40) to the trolley assembly (37).

The top of the leading swing arm (21) has a hydraulic cylinder (41) pivotally attached thereto at pin (42). Similarly, the other end of the hydraulic cylinder (41) is pivotally to the hydraulic cylinder clevis (43) by a pin (44). The hydraulic cylinder has a vent port (45) on the shaft side of piston (46). A hydraulic supply port (47) extends into the cylinder (41) on the other side of the piston (46) for reasons which will be explained below.

Figure 4:
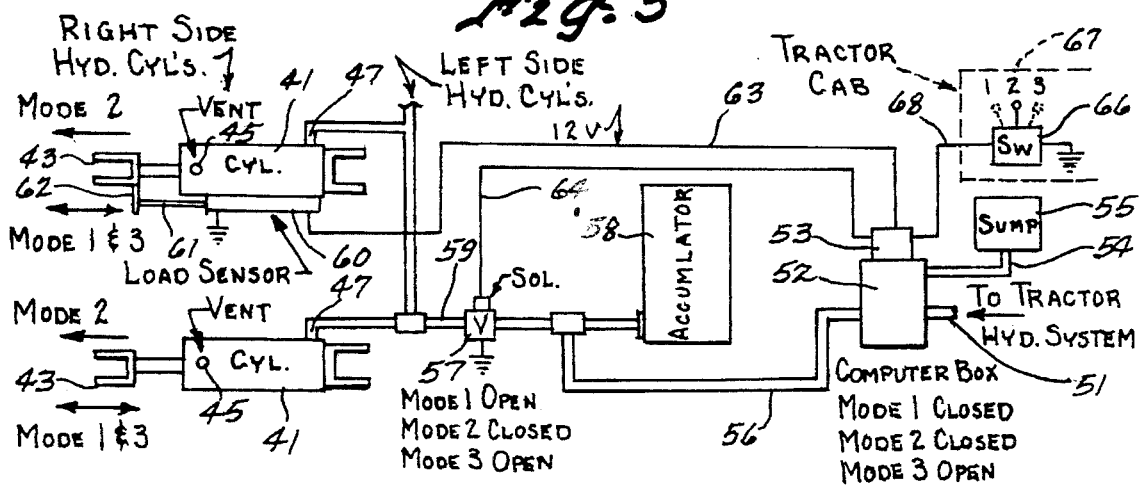
Figure 5:
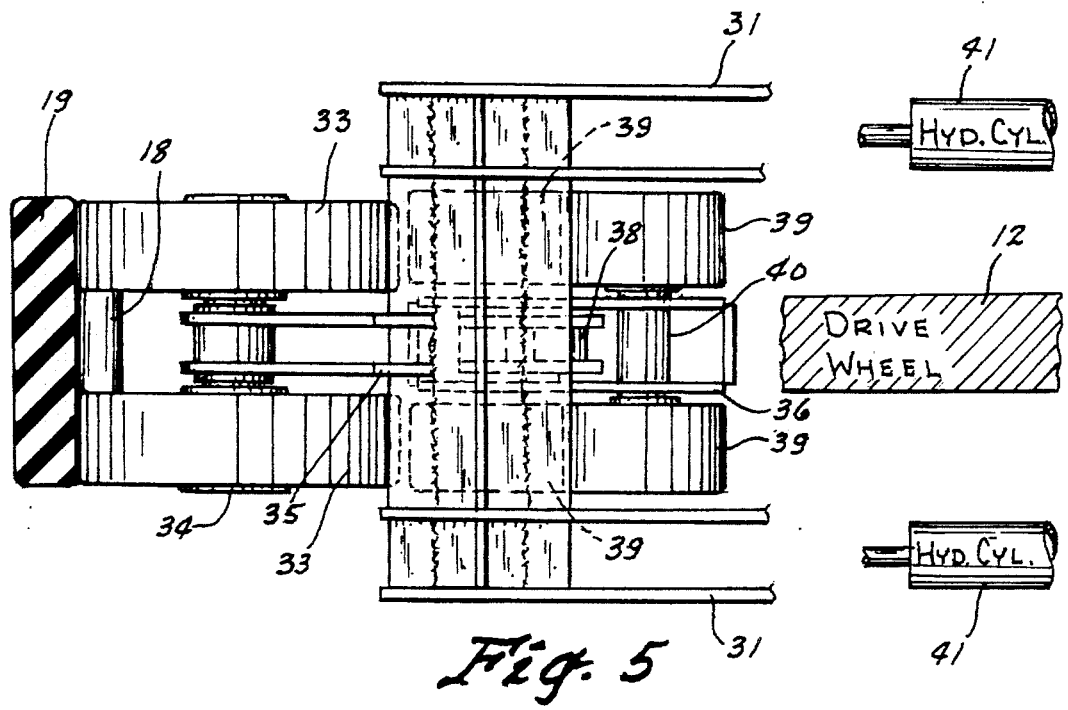
FIG. 5 is an enlarged partial cross sectional view taken along line 5—5 of FIG. 3 and showing the idler wheels and mid-roller assemblies.
Figure 6:
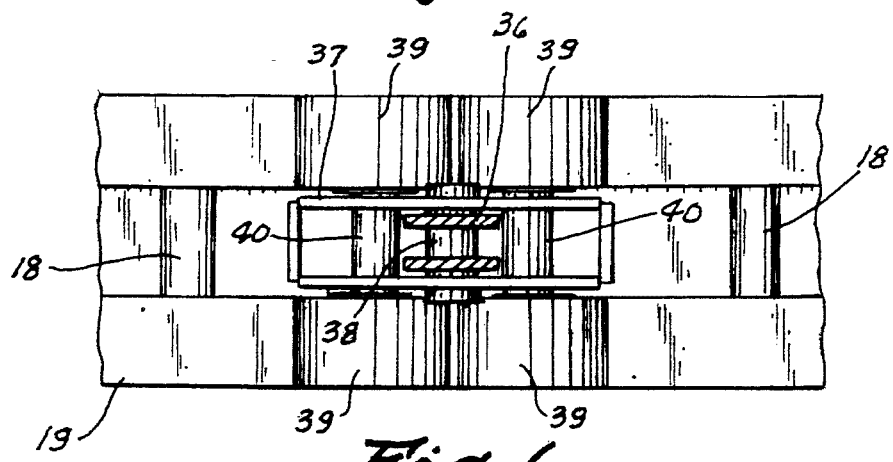
FIG. 6 is an enlarged partial cross-sectional view taken along 6—6 of FIG. 3 showing the mid-roller assemblies and the lower portion of the continuous rubber track.
Figure 7:
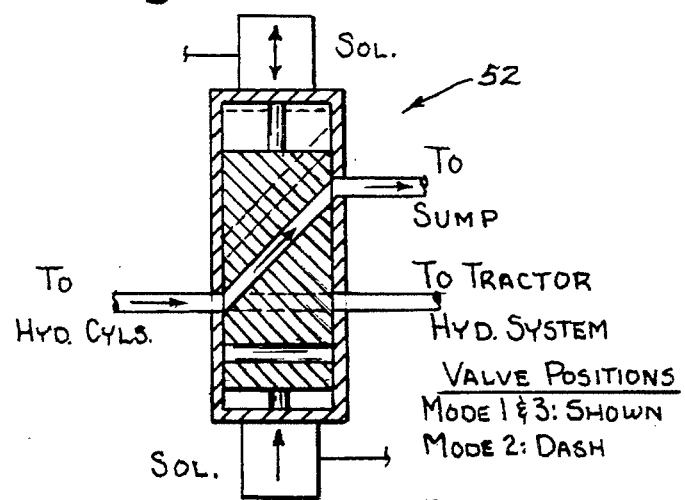
FIG. 7 is an enlarged cross sectional view of a typical type of valve (52) as shown in FIG. 4.

Referring now to FIG. 4, a schematic drawing is shown having a control system attached thereto for the hydraulic cylinders, of which there are two, one on each side of the right wheel (which are shown) and two which are on each side of the left assembly (11) (which are not shown in the schematic of FIG. 4). A pressure port (51) is shown going into a valve (52) which is controlled by computer (53). Also going into the valve (52) is a port (54) which leads to a sump (55).

A hydraulic line (56) leads from the valve (52) to a solenoid valve (57) and to an accumulator (58). A line (59) leads to the high pressure side and port (47) of each of the hydraulic cylinders (41) on the right side assembly (11) and also to both of the hydraulic cylinders (41) on the left side assembly (11).

Figure 2:
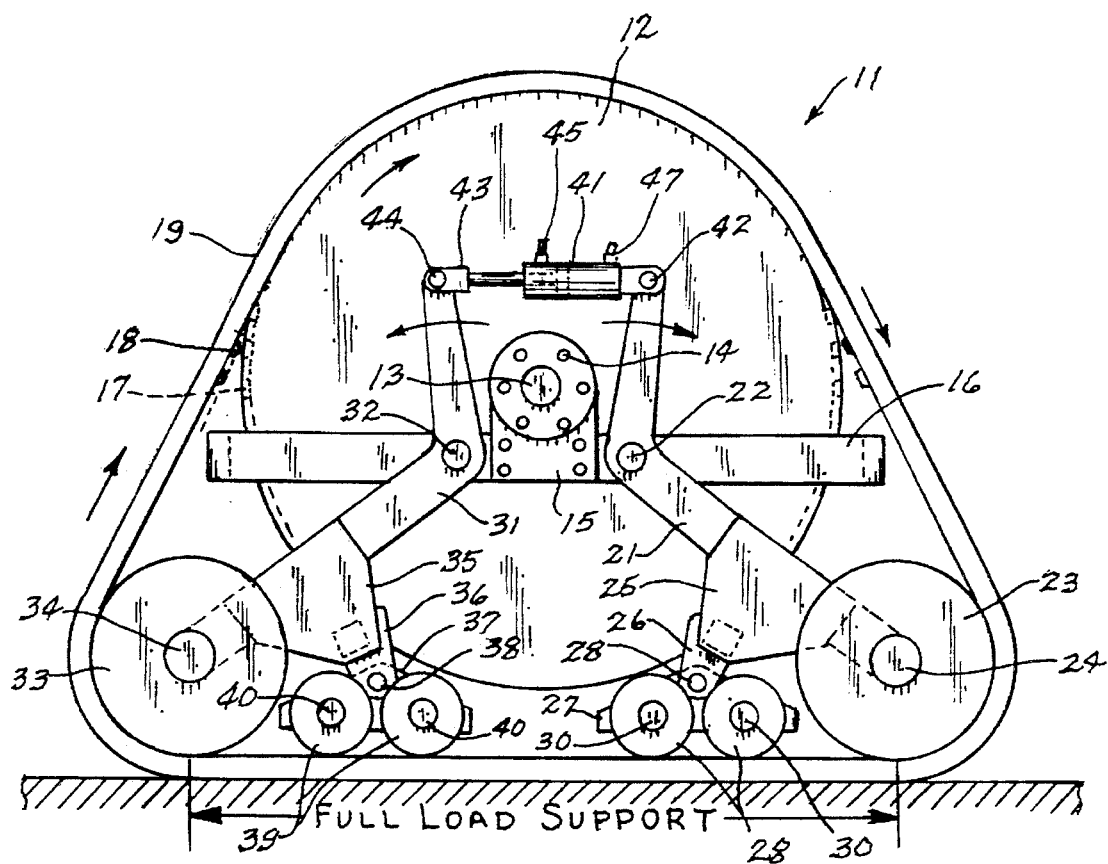
FIG. 2 is a side elevational view taken along line 2—2 of FIG. 1 showing the track system of the present invention.

A load sensor (60) is attached to only one of the hydraulic cylinders (41), although more sensors could be used on the other cylinders if desired. The one sensor (60) is adequate to sense the position of the leading and trailing idlers (23 and 33) based on the length that the hydraulic cylinder (41) has extended as shown in FIG. 2. The sensor (60) has a portion attached to the hydraulic cylinder barrel and has a shaft (61) extending therefrom which is attached to the clevis (43) by a member (62). Consequently, as the hydraulic cylinder (41) lengthens, so does the shaft (61) extend further from barrel portion (60) in which it reciprocates. Likewise when the cylinder (41) retracts, the shaft (61) will retract into the cylinder portion (60) of the load sensor.

The load sensor (60) sends its information back through a 12-volt line (63) to the computer (53). Another 12-volt line (64) leads from the computer (53) to the electrically actuated solenoid valve (57) is spring biased to an open position but will move to a closed position thereof when the computer energizes the line (64) leading from the computer (53) to the solenoid (57).

A switch (66) in the cab (67) of the tractor (10) is of the three position type. It will send a signal through line (68) from the cab of the tractor to the computer (53) depending upon which one of three modes is desired to be used. When the switch (66) is placed in the mode 1 position, the computer (53) will open the valve (52) to allow the pressure from port (51) of the tractor hydraulic system to enter line (56) and at the same time, the solenoid (57) will remain open so that the hydraulic cylinders (41) are pressurized and consequently lengthened to the position shown in FIG. 2, which is the optimum position for the idler rollers (23) for highway travel and also for travel in farm fields during normal conditions. In this position there is full load support on the entire distance shown on the bottom of the robber track as shown in FIG. 2.

In mode 1, as the lead idler wheel (23) encounters obstructions, it may be forced upwardly. This will cause the cylinder (41) to retract slightly to compensate for that upward movement because the pressure can backup into the accumulator (58). The accumulator would typically be a tank having hydraulic oil therein which is charged on the top thereof with nitrogen gas, which will essentially act as a spring to hold the pressure high in the accumulator, but which will accommodate and absorb shocks during those times when the leading roller (23) hits an obstruction, such as a rock or the like, in a field. It is of course understood that if the tractor (10) is put into a reverse gear, the leading and trailing arms, idlers, etc. will essentially reverse. In any event, for the purposes of this description, the leading idler arm and leading idler will be referred to as if it were moving in a forward direction, which it will be doing a high percentage of the time. After the obstruction has been traversed, the pressure in the hydraulic lines will essentially force the idler arms (21) and (31) and respective idler rollers (23 and 33) back to the position shown in FIG. 2, after the shock of hitting the obstruction has passed.

With the tractor in mode 1, it has been determined that while it is very desirable to have as much contact of the track with the ground or highway as possible, this becomes an impediment to turning the tractor when turning is needed. Consequently, when the user of the tractor (10) gets at the end of the row and wants to turn around to go in another direction, the switch (66) can be moved to mode 3 just for turning purposes only.

When the switch (66) is moved to the mode 3 turning mode, solenoid (57) remains open but valve (52) is moved to drain and relieve pressure in the hydraulic line (56) to the sump (55) of the tractor. This essentially relieves the pressure on the high pressure side of each of the hydraulic cylinders (41), which will allow the cylinders to shorten to the FIG. 3 position since they are vented to atmosphere on the other side of the piston. This puts all of the weight on the mid-roller assemblies (27 and 37) on each side of the tractor and shortens the amount of the rubber track (19) which engages the ground or the road. There is no shock absorbing being done in the mode 3 configuration shown in FIG. 3. Consequently, it is not desired to leave it in this mode any longer than is necessary to complete a turn. After the turning is accomplished, the switch (66) is moved back to the mode 1 position where high pressure is returned to line (56). Because solenoid (57) is open, all of the hydraulic cylinders (41) will be moved back to the somewhat extended position desired as shown in FIG. 2.

The load sensor (60) is essentially set for the optimum position shown in FIG. 2 and will tend to hold the hydraulic cylinders (41) in that pre-determined desired position shown in FIG. 2 assuming that the mode 1 position of the switch (66) is maintained. The only thing that will cause it to move is if cushioning is needed due to some irregular condition encountered by the idler pulleys (23 and 33) transmitted to the leading and trailer idler arms (21 and 31). It is noted that the mode 3, FIG. 3, position can be used for turning either in the field or on the highway.

Under very limited circumstances, the mode 2 position may be used. In the mode 2 position, the computer will energize the solenoid (57), thereby causing it to be closed. At the same time, it will completely close off the valve inlet line (51) so that hydraulic fluid from line (56) cannot move from line (51) to (56), nor can the pressure within (56) be in communication with line (54) and the sump of the tractor hydraulic system. By closing the line (56) entirely off and closing the solenoid valve (57), the cylinders (41) will be locked in the FIG. 2 position. Under these circumstances, there is no cushioning because the hydraulic cylinders are no longer in communication with the accumulator (58) and since hydraulic oil is essentially non-compressible. Mode 2 is used when the tractor is traversing very soft ground. The other time that mode 2 would be used would be when it is desired to change out some of the components of the system, such as the accumulator (58) or the hydraulic cylinders (41), or even if one of the hydraulic lines interconnecting the system needed to be replaced.

Referring now to another embodiment (111) shown in FIGS. 8–11, it can be seen that the rubber track (19) is being moved by a larger drive wheel (112) which extends downwardly between and below mid-rollers (129) on mid-roller assembly (120). Each of the mid-rollers (129) are rotatably attached to the subframe (127) by short axles (130) which do not extend completely across the track and thereby permit the drive wheel (112) to extend downwardly between the stop shaft members (130).

The subframe (127) on the mid-roller assembly (120) has an arm (126) rigidly attached to the subframe (127) and pivotally attached by pin (137) to bracket (135). The bracket (135) is rigidly attached to the trailing arm (31). Similarly, a bracket (125) rigidly attached to leading arm (21) is operably, pivotally attached to the other end of the subframe (127) by a link (126) which is pinned at the top thereof to member (127) and at the bottom thereof to the subframe (127) by a pin (128). Further structures can be used instead of the link (126) which can allow some lost motion between the arm (21) and the subframe (127). Also, of course, this link structure (126) could be on both ends of the subframe (127) or on the trailing end instead of the leading end in order to permit the idler arms (23) and (33) to move to the position shown in FIG. 11 and between the position shown in FIGS. 8 and 11 as is needed for proper operation of the device. Otherwise, the apparatus shown in FIGS. 8–10 works exactly like the embodiment shown in FIGS. 1–7, with the same control system being utilized.

Figure 3:
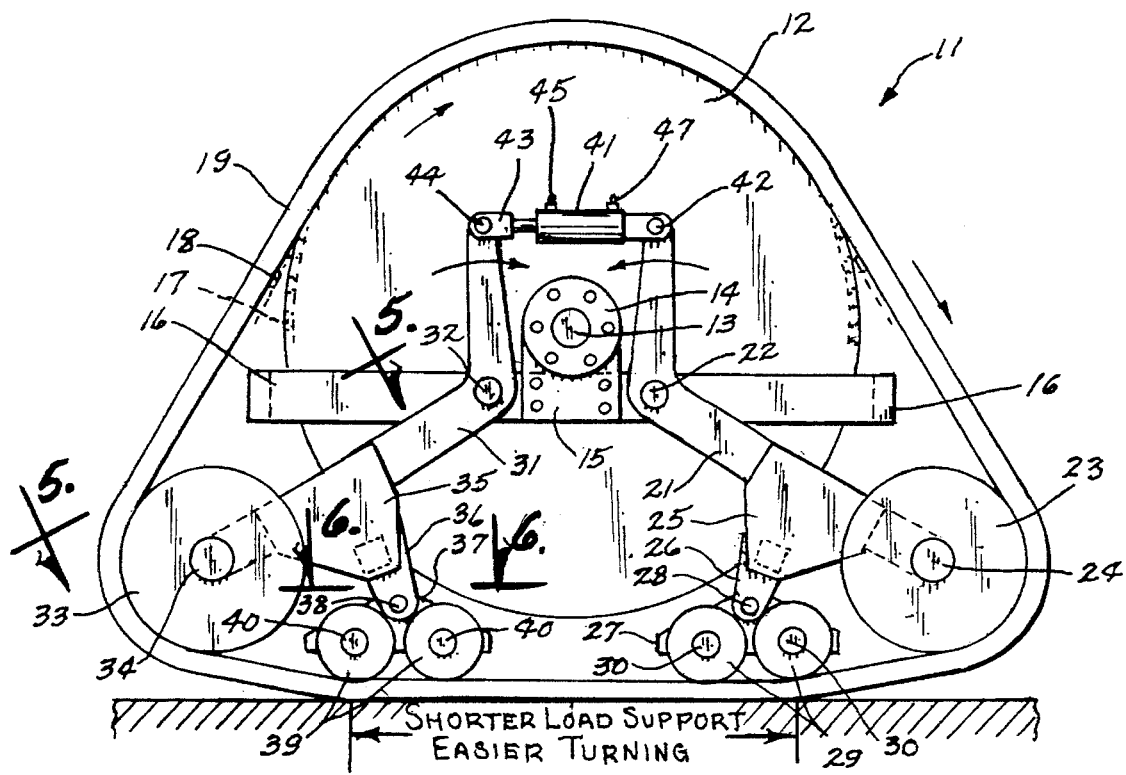
FIG. 3 is a view like FIG. 2, but showing the track system with the hydraulic fluid released, thereby creating a shorter load support for easier turning of the vehicle.

Accordingly, it will be appreciated that the preferred embodiment disclosed herein does indeed accomplish the aforementioned objects. Obviously many modifications and variations of the present invention are possible in light of the above teachings. For example, the hydraulic cylinder could be placed below the pivot pins (22 and 32) on the leading and trailing swing arms (21 and 31) instead of being up higher on extensions of the swing arm members where they are shown in FIGS. 2 and 3. It is therefore to be understood that, within the scope of the appended claims, the invention may be practiced otherwise than as specifically described.

I claim:

1. A track suspension apparatus for a vehicle having a frame, comprising:

a continuous flexible track;

a drive wheel operatively attached to said frame for engaging and driving said continuous flexible track;

a leading idler arm operatively pivotally attached to said frame;

a leading idler wheel in engagement with said track and rotatably mounted to one end of said leading idler arm;

a trailing idler arm operatively pivotally attached to said frame;

a trailing idler wheel in engagement with said track and rotatably mounted to one end of said trailing idler arm;

a mid-roller assembly in engagement with said track and operatively attached to one of said idler arms;

an interconnecting structure for holding said leading and trailing idler arms in a predetermined position; and cushioning means associated with said interconnecting structure for providing a shock absorbing function when said leading and trailing idler wheels move with respect to each other due to pivoting of said idler arms when irregular surfaces are encountered by said track, said cushioning means comprising a fluid control device operably attached at one end thereof to one of said idler arms and operatively attached at the other end thereof to the other one of said idler arms.

2. The apparatus of claim 1 including accumulator means for permitting fluid to move out of said fluid control device and into said accumulator means when an obstruction is encountered by one of said idler wheels.

3. The apparatus of claim 2 including means for temporarily disconnecting said fluid control device from said accumulator means whereby the cushioning function will be discontinued for use in soft ground.

4. A track suspension apparatus for a vehicle having a frame, comprising:

a continuous flexible track;

a drive wheel operatively attached to said frame for engaging and driving said continuous flexible track;

a leading idler arm operatively pivotally attached to said frame;

a leading idler wheel in engagement with said track and rotatably mounted to one end of said leading idler arm;

a trailing idler arm operatively pivotally attached to said frame;

a trailing idler wheel in engagement with said track and rotatably mounted to one end of said trailing idler arm;

a mid-roller assembly in engagement with said track and operatively attached to one of said idler arms;

an interconnecting structure for holding said leading and trailing idler arms in a predetermined position;

cushioning means associated with said interconnecting structure for providing a shock absorbing function when said leading and trailing idler wheels with respect to from each other due to pivoting of said idler arms when irregular surfaces are encountered by said track;

means for sensing the relative pivotal position of said leading and trailing swing arms; and means associated with said sensing means for causing said swing arms to return to said predetermined position after having moved from said predetermined position due to performing a shock absorbing function.

5. A track suspension apparatus for a vehicle having a frame, comprising:

a continuous flexible track;

a drive wheel operatively attached to said frame for engaging and driving said continuous flexible track;

a leading idler arm operatively pivotally attached to said frame;

a leading idler wheel in engagement with said track and rotatably mounted to one end of said leading idler arm;

a trailing idler arm operatively pivotally attached to said frame;

a trailing idler wheel in engagement with said track and rotatably mounted to one end of said trailing idler arm;

a mid-roller assembly in engagement with said track and operatively attached to one of said idler arms;

an interconnecting structure for holding said leading and trailing idler arms in a predetermined position; and means for operably releasing said interconnecting structure whereby said idler arms can freely pivot, thereby causing the lower part of said track to be supported only by said mid-roller assembly whereby a shorter support surface on the bottom of said track will facilitate easier turning.

6. A track suspension apparatus for a vehicle having a frame, comprising:

a continuous flexible track;

a drive wheel operatively attached to said frame for engaging and driving said continuous flexible track;

a leading idler arm operably pivotally attached to said frame;

a leading idler wheel in engagement with said track and rotatably mounted to one end of said leading idler arm;

a trailing idler arm operably pivotally attached to said frame;

a trailing idler wheel in engagement with said track and rotatably mounted to one end of said trailing idler arm;

a mid-roller assembly in engagement with said track and operatively attached to one of said idler arms;

an interconnecting structure for holding said leading and trailing idler arms in a predetermined position; and wherein said drive wheel extends below a top portion of said mid-roller assembly.

7. The apparatus of claim 6 wherein said mid-roller assembly includes a plurality of rollers on both sides of said drive wheel.

8. The apparatus of claim 7 wherein said mid-roller assembly is also operatively attached to the other one of said idler arms.

9. The apparatus of claim 8 wherein said mid-roller assembly is pivotally attached to one of said idler arms at one end thereof.

10. The apparatus of claim 9 wherein said mid-roller assembly is operably pivotally attached at the other end thereof to the other one of said idler arms.

11. The apparatus of claim 9 wherein a link member is operatively pivotally attached at one end thereof to the other end of said mid-roller assembly and is operatively pivotally attached at the other end thereof to the other one of said idler arms thereby allowing said leading and trailing idler wheels to move toward or away from each other while said mid-roller assembly supports a lower part of said track.

12. The apparatus of claim 6 wherein said drive wheel is at least one and one half times as large in diameter as the diameter of said leading idler wheel.

13. The apparatus of claim 6 wherein said drive wheel is at least one and one half times as large in diameter as the diameter of said trailing idler wheel.

14. The apparatus of claim 13 wherein said continuous flexible track has lugs disposed around the center and inner periphery thereof, said lugs being spaced from the outer edges of said track and wherein said drive wheel is substantially only as wide as the lugs on said flexible track.

15. A track suspension apparatus for a vehicle having a frame, comprising:

a continuous flexible track;

a drive wheel operatively attached to said frame for engaging and driving said continuous flexible track;

a leading idler arm operably pivotally attached to said frame;

a leading idler wheel in engagement with said track and rotatably mounted to one end of said leading idler arm;

a trailing idler arm operably pivotally attached to said frame;

a trailing idler wheel in engagement with said track and rotatably mounted to one end of said trailing idler arm;

a mid-roller assembly in engagement with said track and operatively attached to one of said idler arms;

an interconnecting structure for holding said leading and trailing idler arms in a predetermined position;

a second mid-roller assembly operatively attached to the other one of said idler arms; and wherein the first said mid-roller assembly is pivotally attached to said leading idler arm and said second mid-roller assembly is pivotally attached to said trailing idler arm.

16. A track suspension apparatus for a vehicle having a frame, comprising:

- a continuous flexible track having a width and lugs disposed on the inner center portion of said track which have a length which is substantially shorter than the width of said track;
- a drive wheel operatively attached to said frame for engaging and driving said continuous flexible track, said drive wheel being substantially the same width as the length of said lugs;
- a leading idler arm operably pivotally attached to said frame;
- a leading idler wheel in engagement with said track and rotatably mounted to one end of said leading idler arm;
- a trailing idler arm operably pivotally attached to said frame;
- a trailing idler wheel in engagement with said track and rotatably mounted to on end of said trailing idler arm;
- a mid-roller assembly in engagement with said track and operatively attached to one of said idler arms; and
- an interconnecting structure for holding said leading and trailing idler arms in a predetermined position.

* * * * *